United States Patent [19]
Martin, Jr. et al.

[11] 4,161,643
[45] Jul. 17, 1979

[54] WELDING HANDLE ASSEMBLY

[76] Inventors: Timothy J. Martin, Jr., 1328 Pangborn Rd., Lynden, Wash. 98264; David C. Waschke, 7017 Mission Rd., Everson, Wash. 98247

[21] Appl. No.: 846,440
[22] Filed: Oct. 28, 1977
[51] Int. Cl.² .............................................. B23K 9/32
[52] U.S. Cl. .................................... 219/70; 219/138; 219/139
[58] Field of Search ......................... 219/70, 138, 139

[56] References Cited
U.S. PATENT DOCUMENTS

| | | | |
|---|---|---|---|
| 1,508,689 | 9/1924 | Glasser | 219/138 X |
| 2,059,605 | 11/1936 | Powell | 219/138 |
| 2,594,333 | 4/1952 | Medicus | 219/75 |
| 2,826,671 | 3/1958 | Gayley | 219/75 |
| 3,445,623 | 5/1969 | Fukushima | 219/138 |
| 3,456,093 | 7/1969 | Fujita | 219/138 |
| 3,483,348 | 12/1969 | Jenkins | 219/70 |

FOREIGN PATENT DOCUMENTS

| | | | |
|---|---|---|---|
| 257858 | 9/1926 | United Kingdom | 219/138 |
| 408364 | 4/1934 | United Kingdom | 219/138 |

Primary Examiner—Richard R. Kucia

[57] ABSTRACT

An auxiliary handle attached to a main handle of a welding apparatus by means of a circumferential clamp which permits adjustment rotationally and pivotally of the auxiliary handle. A radiation and contact shield, made of a single piece of heat insulating flexible material, is attached to the auxiliary handle so as to provide a forward radiation shield to protect the user's hand from heat generated at the weld area, and a contact insulating portion which permits the user to place the heel of his hand against the work piece being welded, while protecting the user's hand from the heat of the work piece itself.

28 Claims, 5 Drawing Figures

WELDING HANDLE ASSEMBLY

BACKGROUND OF THE INVENTION

1. Field of the Invention

The present invention relates to a device for hand welding, and more particularly to such a device which provides for easier handling of the welding tool and insulation from both heat radiated from the weld location, and heat conducted through the piece being welded.

2. Brief Description of the Prior Art

In a conventional hand welding apparatus, there is an elongate probe having a tip which is placed in proximity to the work piece at the location at which it is being welded, and a main handle extending from the probe. The normal manner of using this welding apparatus is for the user to grasp the handle and manipulate it in such a manner that the tip of the probe is brought in close proximity to the weld location. Normally some sort of shielding is provided to protect the user's hand from the heat radiated from the location of the weld. Also, since a substantial amount of heat is conducted from the location of the weld into the work piece so as to raise it to an uncomfortably high temperature, the user generally keeps his hand out of contact with the work piece being welded.

While the prior art hand welding apparatus noted above is capable of being used to make adequate welds, it does have shortcomings. For example, in accomplishing welds in certain locations, it is sometimes difficult to grasp the handle in a manner that it can conveniently be manipulated to properly accomplish the weld. Further, the normal prior arts welding handle is so arranged that it is not convenient for the person to grasp the handle of the welding tool and yet position his hand in proximity to an adjacent surface of the part being welded to steady his hand and thus facilitate the welding operation. Also, while some of the prior art devices have provided protection from the heat radiated from the weld area, usually none of these have been especially adapted to provide insulation for the person's hand in the event that it comes in contact with the material being welded, such contact either being accidental or deliberate to steady the hand during the welding operation.

With regard to the various devices shown in the prior art, the following patents are generally representative:
U.S. Pat. No. 2,433,792—Sandrik
U.S. Pat. No. 2,411,980—Ringwald
U.S. Pat. No. 2,337,767—Paul
U.S. Pat. No. 2,132,570—Leone
U.S. Pat. No. 1,729,059—Bicsey
U.S. Pat. No. 1,565,406—Allard
U.S. Pat. No. 363,320—Benardos & Olszewski Thus it is an object of the present invention to provide an auxiliary hand welding apparatus which permits a conventional prior art handwelding apparatus to be conveniently manipulated, while providing protection from heat radiated from the weld area, and heat conducted into the work piece being welded.

SUMMARY OF THE INVENTION

In the present invention there is a handle assembly to be used in conjunction with a prior art hand welding apparatus. The prior art welding apparatus comprises an elongate housing having a first lengthwise axis, with a working end tip of tungsten, connected to a main handle having a second lengthwise axis and having an elongate cylindrical configuration. Housed within and extending from the rearward end of said main handle are the electrical cables and gas feed tubes necessary for operation of the welding apparatus. Prior to the present invention the operator of the welding apparatus grasped the main handle in order to move the operating end tip into contact with the work piece to be welded.

Connected to the main handle of the welding apparatus is the auxiliary handle assembly of the present invention. Said auxiliary handle has a third lengthwise axis extending laterally from the main handle. The present invention has a length dimension and a width dimension of a size to be conveniently grasped in the palm of a person's hand, with fingers of the hand spaced along the lengthwise axis of the auxiliary handle.

There is provided by the present invention a radiation shield mounted to said auxiliary handle, having a protective surface with length and width dimensions and spaced forward of said handle a sufficient distance to protect the operator's hand from radiant heat emitted from the location of the welding process. There is also provided an insulating shield having an upper surface adapted to engage the heel of the operator's hand, and a lower surface adapted to be positioned against the exposed surface of the work piece, so that the operator's hand is protected from conducted heat from the location of the welding process.

In the preferred embodiment the auxiliary handle of the present invention is connected to the main handle of the welding apparatus by a mounting means comprising an adjustable clamping means, such as a threadably adjustable screw clamp, which allows adjustment between a secured position tightly holding the main handle and a loose position allowing rotation of the main handle. Rotation of the main handle is possible on an axis generally transverse to the third lengthwise axis of the auxiliary handle and is also possible about the lengthwise axis of the main handle itself.

The radiation and insulating shields of the present invention are formed by attaching a single piece of flexible material, such as rubber, to the auxiliary handle. The material is provided with an upper and a lower hole, the distance between said holes being substantially greater than the distance between their points of attachment on the auxiliary handle. The upper hole receives the upper end of the auxiliary handle and the lower hole receives the lower end of the auxiliary so that there is formed a forwardly and outwardly protruding curved portion of said flexible material acting as a radiation shield. Rearwardly protruding from the lower end of said auxiliary handle there is a flat portion acting as an insulating shield.

The present invention allows the welding operator to rest his hand on the lower insulating shield which is in turn laid on the surface to be welded, thereby serving the dual function of providing insulation against heat conducted through the work piece and radiating therefrom as a result of the welding process, and also providing added stability for the operating hand while performing delicate welding operations. Other features of the present invention will become apparent from the following detailed description.

DESCRIPTION OF THE PREFERRED EMBODIMENT

Figure 1:
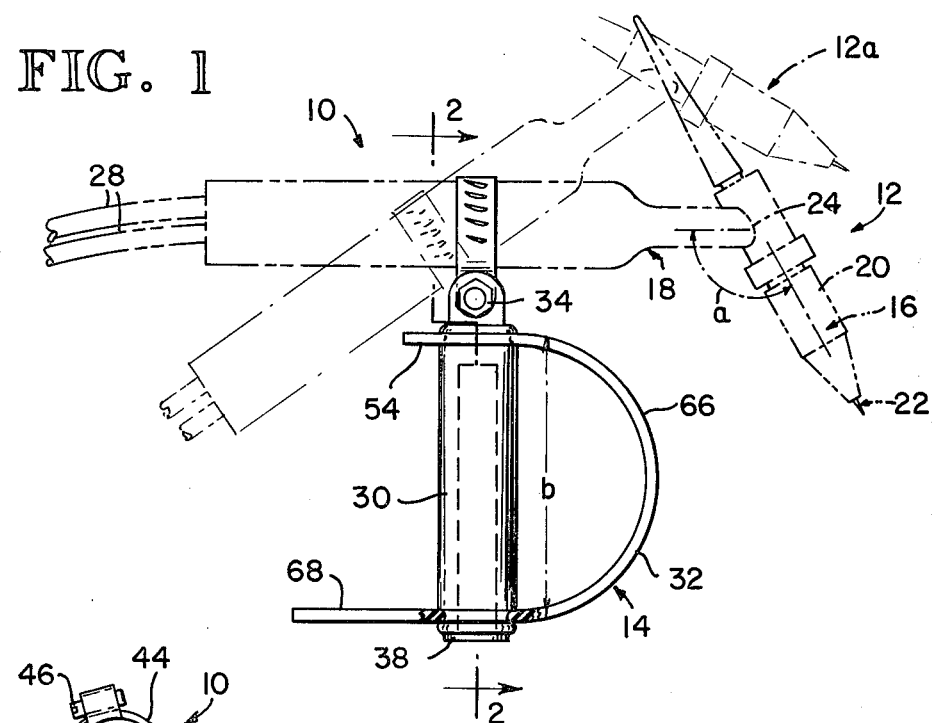
FIG. 1 is a side elevational view of a preferred embodiment of the present invention.
Figure 5:
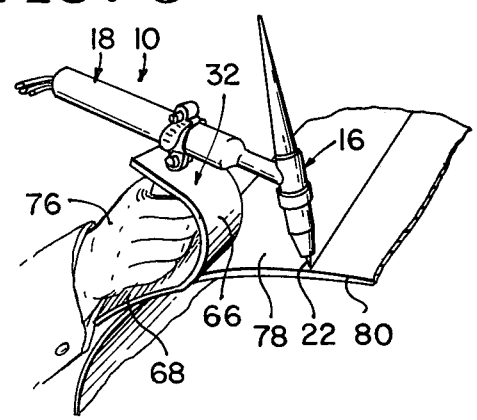
FIG. 5 is an isometric view of the present invention in use in a welding operation.

The present invention is particularly adapted to be used in combination with a conventional welding apparatus. For convenience of illustration, the combination of the present invention (generally designated 10) is shown in FIG. 1, with the welding apparatus which is known in the prior art being designated 12 and being shown in broken lines, and the handle assembly added by the present invention being designated 14 and being shown in full lines. In FIG. 5, the entire combination 10 is shown in full lines.

The prior art apparatus 12 comprises an elongate probe 16 attached to a main handle 18. The probe 16 comprises an elongated housing 20 having at its lower working end a tip 22 of a tungsten rod contained in the housing 20. In normal operation, the tungsten tip 22 is placed in close proximity to the piece to be welded so that an electric arc is created to generate sufficient heat to form the weld. Inert gas is emitted from small jets surrounding the tip 22 to prevent oxidation in the weld area.

The probe housing 20 is connected at 24 to the main handle 18 which has an elongate cylindrical configuration. In the usual prior art configuration, the lengthwise axis of the handle 18 is positioned at an angle of greater than 90° (indicated at "a" in FIG. 1) from the axis of the probe housing 20 which extends from the connecting point 24 toward the tip 22. The main handle 18 contains the electrical cables and gas feed tube (these being indicated at 28) that supply electrical power and gas to the tip 22 of the probe 16.

It is to be understood that the components 16 through 28 described thus far already exist in the prior art as a complete welding apparatus which can be operated to perform a welding operation. The usual means of doing this is for the operator to grasp the main handle 18 to move the tip 22 into proximity with the work piece to be welded.

To describe now the novel components contributed by the present invention, the handle assembly 14 comprises an auxiliary handle 30, a radiation and contact shield 32, and an adjustable connecting member 34. The auxiliary handle 30 has length and width dimensions such that it can be conveniently grasped in the palm of a person's hand with the fingers of the hand surrounding the handle 30 and being spaced along its lengthwise axis, as shown in FIG. 5. Thus, the handle 30 is normally about four to five inches long, and slightly oval in cross-sectional configuration, with the greater width dimension being approximately an inch. The interior of the auxiliary handle 30 has an interior chamber 36 to contain additional tungsten rods, and this chamber 36 is closed at its bottom end by a removable plug 38.

To attach the auxiliary handle 30 to the connecting means 34, the upper end of the auxiliary handle 30 is provided with an upstanding ear 40 having therein a slit 42 aligned with the lengthwise axis of the handle 30. The connecting means 34 comprises a circular clamp 44 having two transversely slotted sections connected by an adjusting screw 46. The threads of the adjusting screw 46 fit into the slots of the two portions of the clamp 44 so that the diameter of the clamp 44 can be increased or decreased by turning the screw 46.

The lower ends 48 of the two clamp sections fit into the slit 42 in the ear 40. A clamping bolt 50 extends through aligned through holes in the ear 40 and the two lower connecting ends 48 of the sections of the clamp 44. The clamp 44 fits around the main handle 18 of the welding apparatus 12. By moving the adjusting screw 46 to loosen the clamp 44, the welding apparatus 12 can be rotated about the lengthwise axis of the main handle 18 to a desired position, after which it can be clamped in that position by simply tightening the adjusting screw 46.

Also, it should be noted that the lengthwise axis of the clamping bolt 50 is perpendicular to the lengthwise axis of the auxiliary handle 30 and perpendicular also to the lengthwise axis of the main handle 28. Thus, by loosening the nut 52 on the clamping bolt 50, the welding apparatus 12 can be rotated about the axis of the clamping bolt 50 to the desired position and held in that position by tightening the nut 52. This rotational movement about the axis of the clamping bolt 50 is illustrated schematically in FIG. 1 by showing a portion of the welding apparatus 12 in broken lines being rotated to a second position, this being indicated at 12a.

The radiation and contact shield 32 is provided quite conveniently in the present invention in the form of a flat piece of moderately flexible heat insulating material, such as rubber. The shield 32 has an upper end 54 formed with an upper hole 56 which receives the upper end of the auxiliary handle 30 so that the edge portions of the shield surrounding the hole 56 fit into an upper circumferential groove 58 in the upper end of the handle 30. Likewise, the lower end 60 of the shield 32 has a hole 62 to permit engagement of the lower end of the auxiliary handle 30 therein, the handle 30 being provided with a lower groove 64 for proper engagement.

Figure 4:
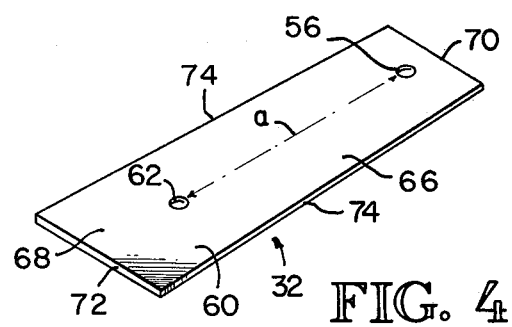
FIG. 4 is an isometric view of the flexible piece of material used to make the heat insulating shields of the present invention.

The distance between the two shield holes 56 and 62 (indicated at "a" in FIG. 4) is moderately greater than the distance between the two connecting locations on the auxiliary handle 30 (this distance being indicated at "b" in FIG. 1). Thus, with the shield 32 in its installed position, the shield portion 66 between the two holes 56 and 62 protrudes outwardly in a rounded configuration to provide a radiation shield forwardly of the handle 30.

Figure 2:
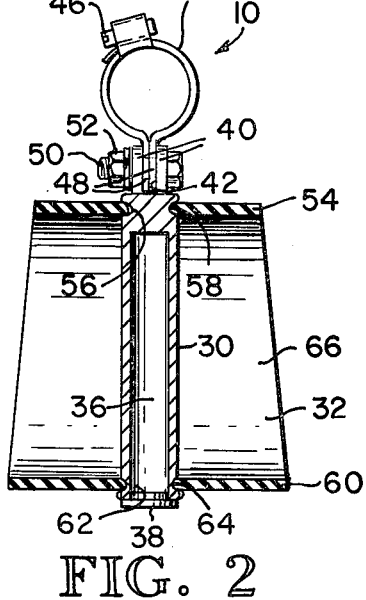
FIG. 2 is a sectional view taken along line 2—2 of FIG. 1.
Figure 3:
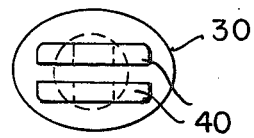
FIG. 3 is a top end view of the auxiliary handle of the present invention, separate from the other components of the invention.

Also, it will be noted that the lower end of the shield extends moderately beyond the lower hole 62 to form a rearward extension 68. This extension 68 provides a hand insulator for the person grasping the auxiliary handle 30. The width dimension of the shield 32 is sufficient to provide heat insulation for the person's hand with respect to both the radiation emitted from the weld area adjacent the tip 22 and with regard to heat which would otherwise be transmitted by contact with the operator's hand with the exposed surface of the work that is being welded. In the preferred configuration, the shield 32 has the general configuration of a trapezoid, with the upper and lower edges 70 and 72, respectively, being parallel and the two side edges 74 diverging from the upper edge 70 moderately outwardly to the bottom edge 72. Thus, as can be seen in FIG. 2, the lower portion of the shield 32 has a width moderately greater than the upper portion thereof.

The operation of the present invention can be readily understood from an examination of FIG. 5. The auxiliary handle 30 is grasped in the person's hand 76 with the thumb portion of the hand being adjacent the upper end of the handle 30 and the heel of the hand being adjacent the lower end of the auxiliary handle 30. The middle portion 66 of the shield 32 is positioned between the person's hand 76 and the welding tip 22 so as to protect the hand 76 from radiation emitted from the weld area adjacent the tip 22. The rearward extension 68 of the shield 32 and that portion of the shield 32 immediately forward of the lower hole 62 acts as a contact shield and permits the heel and lower finger of the person's hand to rest against an exposed surface 78 of a work piece 80 which is being welded.

The position of the welding probe 16 can be quite readily adjusted to most any position, simply by rotating the apparatus 12 about the lengthwise axis of the main handle 18 and also rotating the main handle 18 about the transverse axis of the clamping bolt 50. When the probe is in the desired position, the adjusting screw 46 is turned to tighten the clamp 44 and the nut 52 is tightened to hold the clamp 44 securely relative to the auxiliary handle 30. Also, the shield 32 is readily adjustable to go around the auxiliary handle 30 so that it can accommodate itself to different operating positions of the tip 22.

What is claimed is:

1. A welding apparatus adapted to form a weld on a work piece having a weld location at which said weld is to be made, and an exposed surface area spaced from said weld location, said apparatus comprising in combination:
   a. a welding probe having a first lengthwise axis and having an operating end adapted to be placed in proximity to said weld location of said work piece to form a weld at said weld location,
   b. a main handle having a forward end to which said probe is mounted, said main handle having a second lengthwise axis extending laterally from said first lengthwise axis,
   c. an auxiliary handle assembly connected to said main handle, said auxiliary handle assembly comprising:
      1. a handle portion pivotally connected to said main handle and having a third lengthwise axis extending laterally from said second lengthwise axis, said handle portion having a forward portion and a rearward portion, a length dimension and width dimension such that it can be grasped in the palm of a person's hand, with fingers of the hand spaced along the lengthwise axis of the handle portion, said handle portion having an upper end by which it is attached to said main handle, and also a lower end, the lengthwise dimension of the handle being such that the lower end thereof extends at least to a heel portion of the hand grasping the handle portion,
      2. insulating means mounted to said handle portion comprising:
         a. a first insulating portion mounted to said handle portion and having a protective surface spaced forward of said handle a sufficient distance to be positioned forward of the hand grasping the handle portion, said protective surface having lengthwise and a width dimensions sufficient to provide protection from radiant heat emitted from the location of the operating end of the probe at the weld location, and
         b. a second insulating portion spaced rearward of said handle portion at said lower end of said handle portion, said second insulating portion having an upper surface adapted to engage the heel of the hand grasping the handle portion, and lower surface adapted to be positioned against the exposed surface of the work piece, to provide protection from conducted heat in said work piece, whereby a person is able to operate said apparatus by grasping the handle portion and resting the heel of the hand on the exposed surface of the work piece with the second insulating portion positioned therebetween, and with the operating end of the probe being positioned in proximity to the weld location.

2. The apparatus as recited in claim 1, wherein there is a mounting means connecting said handle assembly to the main handle and constructed so as to allow relative rotation between the main handle and the handle assembly.

3. The apparatus as recited in claim 2, wherein the mounting means permits rotation of the main handle on an axis generally transverse to the third lengthwise axis of the handle assembly and generally transverse to the lengthwise axis of the main handle.

4. The apparatus as recited in claim 3, wherein the mounting means permits rotation of the main handle about its lengthwise axis relative to the auxiliary handle.

5. The apparatus as recited in claim 4, wherein said mounting means comprises an adjustable clamping means engaging said main handle, said clamping means being adjustable between a secured position tightly holding the main handle, and a loose position allowing rotation of the main handle.

6. The apparatus as recited in claim 1, wherein said first insulating portion and said second insulating portion comprise a unitary flexible piece of material which is attached to said auxiliary handle to form both a radiation shield and an insulating shield.

7. The apparatus as recited in claim 6, wherein said flexible piece extends from an upper location on said auxiliary handle forwardly and outwardly and then downwardly to a lower location on said handle, and thence rearwardly of said auxiliary handle to form a rearwardly extending portion of said insulating shield.

8. The apparatus as recited in claim 6, wherein said flexible piece of material is formed with an upper hold to receive an upper end of said auxiliary handle so as to be attached thereto, and a lower hole to receive a lower end of said auxiliary handle so as to be secured thereto.

9. The welding apparatus as recited in claim 1, wherein there is mounting means to connect said handle portion to said main handle, said mounting means comprising a circumferential clamp which extends around said main handle, said clamp having tightening means whereby it can be moved to a secured or a loosened position with respect to said main handle, said circumferential clamp being adjustably mounted to said handle portion about an axis generally perpendicular to the axis of the handle portion.

10. The apparatus as recited in claim 9, wherein said clamp is secured to said auxiliary handle by bolt means extending through a lower end of said clamp and through an upper end of said handle portion, said bolt means being provided with nut means so that the position of the circumferential clamp relative to the auxiliary handle can be either secured by tightening the bolt means or adjusted by loosening the bolt means.

11. The apparatus as recited in claim 1, wherein said first insulating portion and said second insulating portion comprise a unitary piece of material which extends from an upper end of said handle forwardly and outwardly and then downwardly to connect to a lower end of said handle, said unitary piece then extending in a rearward direction of said handle to provide insulation for a heel portion of a person's hand that grasps said handle, with the forward protruding portion of said unitary member providing a radiation shield.

12. In a welding apparatus adapted to form a weld on a work piece having a weld location at which said weld is to be made, and an exposed surface area spaced from said weld location, said apparatus comprising in combination:
   a. a welding probe having a first lengthwise axis and having an operating end adapted to be placed in proximity to said weld location of said work piece to form a weld at said weld location, and
   b. a main handle having a forward end to which said probe is mounted, said main handle having a second lengthwise axis extending laterally from said first lengthwise axis,
the improvement comprising a handle assembly adapted to be connected to the main handle of the welding apparatus, and to facilitate convenient use thereof, said handle assembly comprising:
   a. a handle portion adapted to be pivotally connected to said main handle and having a third lengthwise axis extending laterally from said second lengthwise axis, said handle portion having a forward portion and a rearward portion, a length dimension and width dimension such that it can be grasped in the palm of a person's hand, with fingers of the hand spaced along the lengthwise axis of the handle portion, said handle portion having an upper end by which it is attached to said main handle, and also a lower end, the lengthwise dimension of the handle being such that the lower end thereof extends at least to a heel portion of the hand grasping the handle portion,
   b. insulating means mounted to said handle portion comprising:
      1. a first insulating portion mounted to said handle portion and having a protective surface spaced forward of said handle a sufficient distance to be positioned forward of the hand grasping the handle portion, said protective surface having lengthwise and width dimensions sufficient to provide protection from radiant heat emitted from the location of the operating end of the probe at the weld location, and
      2. a second insulating portion spaced rearward of said handle portion at said lower end of said handle portion, said second insulating portion having an upper surface adapted to engage the heel of the hand grasping the handle portion, and lower surface adapted to be positioned against the exposed surface of the work piece, to provide protection from conducted heat in said work piece,
whereby, in combination with a welding apparatus, a person is able to operate said handle assembly by grasping the handle portion and resting the heel of the grasping hand on the exposed surface of the work piece with the second insulating portion positioned therebetween, and with the operating end of the probe being positioned in proximity to the weld location.

13. The apparatus as recited in claim 12, wherein there is a mounting means adapted to connect said handle assembly to the main handle and constructed so as to allow relative rotation between the main handle and the handle assembly.

14. The apparatus as recited in claim 13, wherein the mounting means permits rotation of the main handle on an axis generally transverse to the third lengthwise axis of the handle assembly and generally transverse to the lengthwise axis of the main handle.

15. The apparatus as recited in claim 14, wherein the mounting means permits rotation of the main handle about its lengthwise axis relative to the auxiliary handle.

16. The apparatus as recited in claim 15, wherein said mounting means comprises an adjustable clamping means engaging said main handle, said clamping means being adjustable between a secured position tightly holding the main handle, and a loose position allowing rotation of the main handle.

17. The apparatus as recited in claim 12, wherein said first insulating portion and said second insulating portion comprise a unitary flexible piece of material which is attached to said auxiliary handle to form both a radiation shield and an insulating shield.

18. The apparatus as recited in claim 17, wherein said flexible piece extends from an upper location on said auxiliary handle forwardly and outwardly and then downwardly to a lower location on said handle, and thence rearwardly of said auxiliary handle to form a rearwardly extending portion of said insulating shield.

19. The apparatus as recited in claim 17, wherein said flexible piece of material is formed with an upper hole to receive an upper end of said auxiliary handle so as to be attached thereto, and a lower hole to receive a lower end of said auxiliary handle so as to be secured thereto.

20. The welding apparatus as recited in claim 12, wherein there is mounting means to connect said handle portion to said main handle, said mounting means comprising a circumferential clamp which extends around said main handle, said clamp having tightening means whereby it can be moved to a secured or a loosened position with respect to said main handle, said circumferential clamp being adjustably mounted to said handle portion about an axis generally perendicular to the axis of the handle portion.

21. The apparatus as recited in claim 20, wherein said clamp is secured to said auxiliary handle by bolt means extending through a lower end of said clamp and through an upper end of said handle portion, said bolt means being provided with nut means so that the position of the circumferential clamp relative to the auxiliary handle can be either secured by tightening the bolt means or adjusted by loosening the bolt means.

22. The apparatus as recited in claim 12, wherein said first insulating portion and said second insulating portion comprise a unitary piece of material which extends from an upper end of said handle forwardly and outwardly and then downwardly to connect to a lower end of said handle, said unitary piece then extending in a rearward direction of said handle to provide insulation for a heel portion of a person's hand that grasps said handle, with the forward protruding portion of said unitary member providing the radiation shield.

23. The apparatus as recited in claim 1, wherein said handle portion defines a longitudinal cavity therein, said cavity being aligned along said third lengthwise axis.

24. The apparatus as recited in claim 23, wherein said lower end of said handle portion defines an aperture therein, said aperture communicating with said longitudinal cavity and adapted to have a removable plug inserted therein.

25. The apparatus as recited in claim 24, wherein said longitudinal cavity is adapted to contain a plurality of welding rods therein, said removable plug restraining said welding rod therein.

26. The apparatus as recited in claim 12, wherein said handle portion defines a longitudinal cavity therein, said cavity being aligned along said third lengthwise axis.

27. The apparatus as recited in claim 26, wherein said lower end of said handle portion defines an aperture therein, said aperture communicating with said longitudinal cavity and adapted to have a removable plug inserted therein.

28. The apparatus as recited in claim 27, wherein said longitudinal cavity is adapted to contain a plurality of welding rods therein, said removable plug restraining said welding rod therein.

* * * * *